US011338890B1

(12) United States Patent
Bomback et al.

(10) Patent No.: US 11,338,890 B1
(45) Date of Patent: May 24, 2022

(54) LINE CUTTER APPARATUS

(71) Applicant: The United States of America as represented by the Secretary of the Navy, Newport, RI (US)

(72) Inventors: Lucas A Bomback, Swansea, MA (US); Bryan B Bohn, Newport, RI (US)

(73) Assignee: The United States of America as represented by the Secretary of the Navy

( * ) Notice: Subject to any disclaimer, the term of this patent is extended or adjusted under 35 U.S.C. 154(b) by 162 days.

(21) Appl. No.: 17/015,164

(22) Filed: Sep. 9, 2020

(51) Int. Cl.
*B63B 21/66* (2006.01)
*B33Y 80/00* (2015.01)

(52) U.S. Cl.
CPC .............. *B63B 21/66* (2013.01); *B33Y 80/00* (2014.12)

(58) Field of Classification Search
CPC ................................ B63B 21/00; B63B 21/66
USPC ...................................................... 114/221 A
See application file for complete search history.

(56) References Cited

U.S. PATENT DOCUMENTS

| 2,402,057 | A | * | 6/1946 | Kottman | B63G 7/04 114/221 A |
| 2,420,987 | A | * | 5/1947 | Temple, Jr. | B63G 7/04 114/221 A |
| 3,071,098 | A | * | 1/1963 | Hinckley | B63G 7/04 114/221 A |
| 3,773,009 | A | * | 11/1973 | Pecksen | B63G 7/04 114/221 A |
| 9,193,422 | B1 | * | 11/2015 | Neumann | B63G 7/04 |
| 9,796,455 | B2 | * | 10/2017 | Larsen | B63B 21/66 |

\* cited by examiner

*Primary Examiner* — Lars A Olson
(74) *Attorney, Agent, or Firm* — James M. Kasischke; Michael P. Stanley (57) ABSTRACT

A line-cutter apparatus capable of being mounted on a tow cable is provided. A body is formed from two releasably coupled housings having a central bore when combined. A plurality of longitudinal grooves are formed in the body that divide the body into a respective plurality of longitudinal segments. Guard portions on the body correspond to the longitudinal segments. The body has fin portions that correspond to the longitudinal segments. Blades corresponding to the segments are received within the body and have a cutting edge that protrudes into one respective passageway of a longitudinal segment.

17 Claims, 10 Drawing Sheets

LINE CUTTER APPARATUS

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

Field of the Invention

The present disclosure relates to the field of towed sensor arrays. More specifically, the present disclosure relates to a line-cutter apparatus, capable of being mounted on a tow cable and used in conjunction with towed sensor arrays.

Description of the Prior Art

Towed sonar arrays (referred to herein in the singular as a towed array) are typically used by military and commercial entities to detect and locate underwater targets. In military applications, the targets may be submarines. In commercial applications, the targets may be shipwrecks on the ocean floor or underwater structures, both manufactured and natural, related to oil exploration and drilling, for example.

Towed sonar arrays typically consist of a lengthwise series of underwater passive acoustic sensing elements referred to as hydrophones. Active sound emitting elements and other types of sensor elements may be included in the towed array. The elements of the towed array are typically housed in a fluid filled flexible structure that may be made of a waterproof material such as polyurethane or polyethylene, for example. In general, references made to a towed array herein are directed to the fluid filled flexible structure.

The towed array may be electromechanically coupled to a ship via a tow cable. The towed array and tow cable are typically stored on a storage reel. The towed array and tow cable can be unreeled from this reel and deployed behind a ship. Weights or some other arrangement may be used to locate the towed array at a given depth. Electrical power and signal conductors, including fiber optics if used, may be used carry power to the towed array and to carry signals (including control and data) to and from the towed array via the tow cable. For example, conductors and fiber optics may be located within a central lumen of the tow cable or coiled about the outer surface of the tow cable. The tow cable is the last to be unreeled from the storage reel as the towed array is deployed from the ship and the first to be reeled onto the storage reel as the tow cable is retrieved. To isolate the towed array from vibrations of the ship transferred along the tow cable, as well as from vibrations of the tow cable itself as it is pulled through the water, a vibration isolation module (VIM) may be coupled between the end of the tow cable and the beginning of the towed array.

Debris filled maritime domains present unique challenges to the reliability of towed sonar arrays. The harmful impacts of commercial fishing tackle, natural debris, trash, and other flotsam are a recognized danger to towed sonar arrays. Both the towed sonar array and the VIM are susceptible to punctures from this flotsam. The tow cable may contact the flotsam, for example a fishing line, and may guide a hook coupled to that line to the VIM and the towed array following the VIM. A VIM and/or the towed array snagged and possibly penetrated by the hook (or other flotsam) may fail. As the VIM is closest to the ship (at the end of the tow cable), a failed VIM may result in an entire towed array being taken out of commission. The time it takes to retrieve the towed array, repair, or replace the VIM, deploy the towed array, and return to underwater sonar operations is wasted time. Therefore, it would be desirable to develop an apparatus to protect the VIM and/or the towed array following the VIM, from the harmful effect of flotsam.

SUMMARY OF THE INVENTION

The present disclosure relates to a line-cutter apparatus capable of being mounted on a tow cable. A body is formed from two releasably coupled housings having a central bore when combined. A plurality of longitudinal grooves are formed in the body that divide the body into a respective plurality of longitudinal segments. Guard portions on the body correspond to the longitudinal segments. The body has fin portions that correspond to the longitudinal segments. Blades corresponding to the segments are received within the body and have a cutting edge that protrudes into one respective passageway of a longitudinal segment.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, details of well-known structures and components are shown in simplified form in order to avoid obscuring such concepts.

Figure 1:
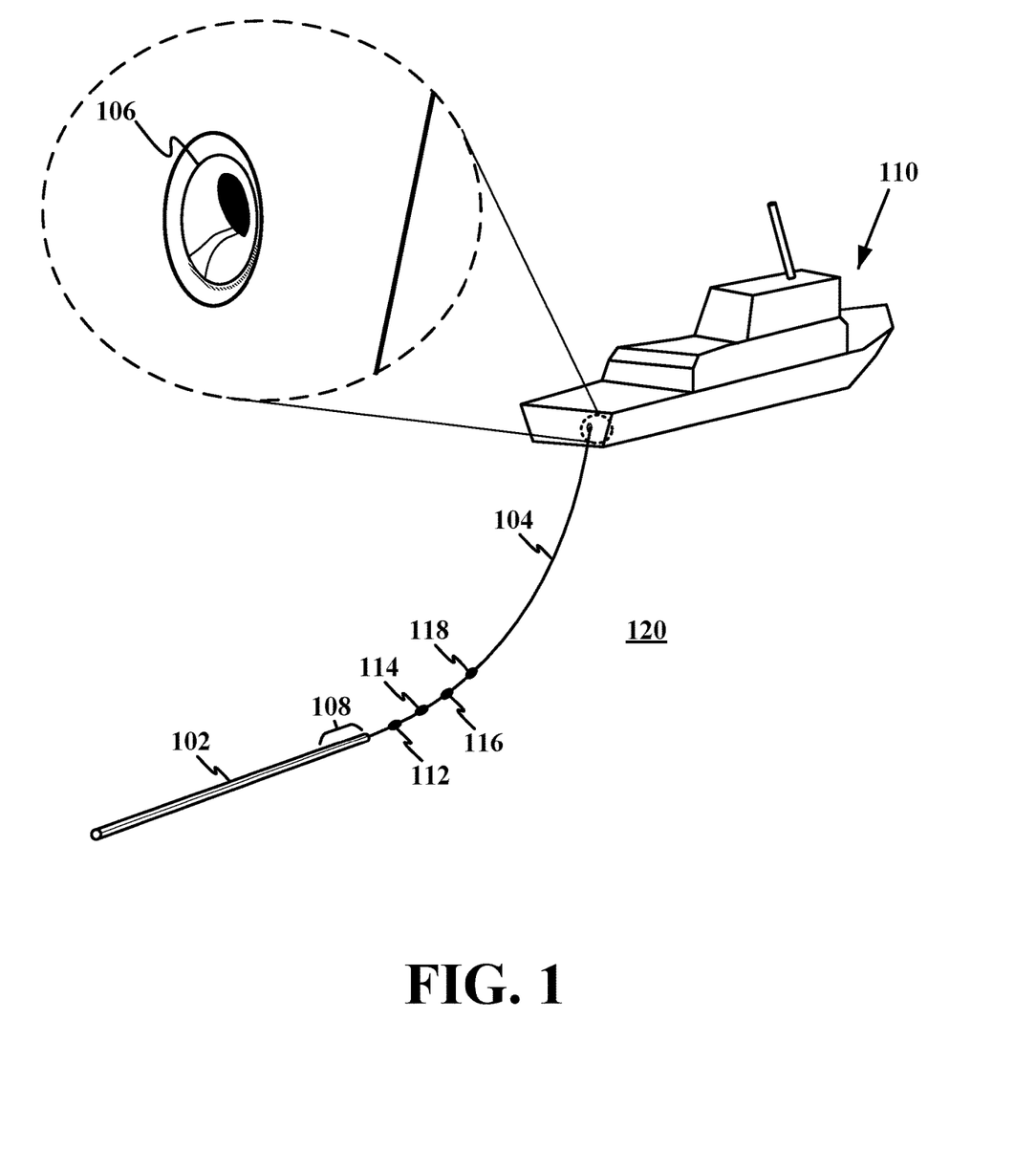
FIG. 1 illustrates a deployed towed array coupled to an end of a tow cable with a plurality of line-cutter apparatuses mounted on the tow cable according to some aspects of the disclosure.

FIG. 1 illustrates a deployed towed array 102 coupled to an end of a tow cable 104 with a plurality of line-cutter apparatuses 112, 114, 116, 118 mounted on (e.g., coupled to) the tow cable 104 according to some aspects of the disclosure. The towed array 102 may include a vibration isolation module (VIM) 108. The VIM 108 may be coupled to the towed array 102 using a coupling structure known to those of skill in the art. The tow cable 104 may be coupled to the VIM 108 using a coupling structure known to those of skill in the art. The VIM 108 may isolate vibrations from the ship 110 (e.g., vibrations caused by the engines of the ship 110), as well as vibrations due to motion of the tow cable 104 as it passes through the aquatic medium 120, from being sensed by the acoustic sensors (e.g., hydrophones) of the towed array 102.

The towed array 102, including the VIM 108, and the tow cable 104 may be deployed from a stern of the ship 110 through a fairlead 106 (see inset). The fairlead 106 may be an opening that penetrates the hull of the ship 110 as shown. In general, the fairlead 106 may be a structure used to guide a line, rope, or cable clear of obstructions. The fairlead 106 may prevent the line, rope, or cable from moving laterally and/or prevent the line, rope, or cable from being cut or chafed. The fairlead 106 of the exemplary illustration of FIG. 1 has a bell-horn type shape. Other shapes or other types of fairleads are within the scope of the disclosure. The fairlead 106 may be made of metal and may have a plated surface. The plated surface of the fairlead 106 may be configured to provide a smooth surface on which the towed array 102, including the VIM 108, and the tow cable 104 the may slide during deployment and retrieval of the towed array 102. The fairlead 106, or at least a plated surface of the fairlead 106 (if plated), may have a hardness that may resist being scratched by the motion of the towed array 102 and tow cable 104.

Similarly, the fairlead 106, may have a finish that is smooth so as to not impart any scratches or cuts in the sheathing of the tow cable 104 or the surface of the towed array 102 as they pass through the fairlead 106. Use of one or more of the line-cutter apparatuses 112, 114, 116, 118 should not be a cause of compromised finish for the fairlead 106. Scratches, cuts, or gouges in the surface of the fairlead 106 may lead to undesirable rusting of the fairlead 106 and may in turn lead to undesirable scratches, cuts, or gouges in the relatively soft outer jacket of the towed array 102, including the VIM 108. Scratches, cuts, or gouges imparted to the towed array 102, the VIM 108, and/or the tow cable 104 from, for example, the fairlead 106 may operationally harm the towed array 102, the VIM 108, and/or the tow cable 104. For example, marine organisms may take hold of or within the scratches, cuts, or gouges. The growth of the marine organisms may lead to undesirable turbulence of the water passing along the tow cable 104, the VIM 108, and towed array 102. FIG. 1 is not drawn to any scale. The size relationships and orientations of all aspects of the figure are purely for illustrative and non-limiting purposes.

According to some aspects, the line-cutter apparatus described herein may serve to combat flotsam, such as, but not limited fishing tackle, stranded braided fishing line of synthetic or metal, stranded braided rope of synthetic or metal, nets, and other trawls that may be associated with commercial fishing. Such flotsam may include hooks that may puncture, scratch, tear, or gouge the VIM 108 and/or towed array 102. The line-cutter apparatus described herein may also serve to repel, or at least not attract, marine predators such as sharks. According to some aspects, the line-cutter apparatus described herein may be made of or coated with a dark (e.g., black) material to absorb light. The line-cutter apparatus described herein may additionally or alternatively be coated with a non-reflective material to avoid reflecting light. Additionally, the plurality of blades (e.g., 348 of FIG. 3) may be enclosed or recessed within passageways internal to the line-cutter apparatus. The exemplified configurations of the line-cutter apparatus may expose only small portion of the plurality of (e.g., metallic, reflective) blades, thereby reducing a probability of a reflection from a blade.

Figure 2:
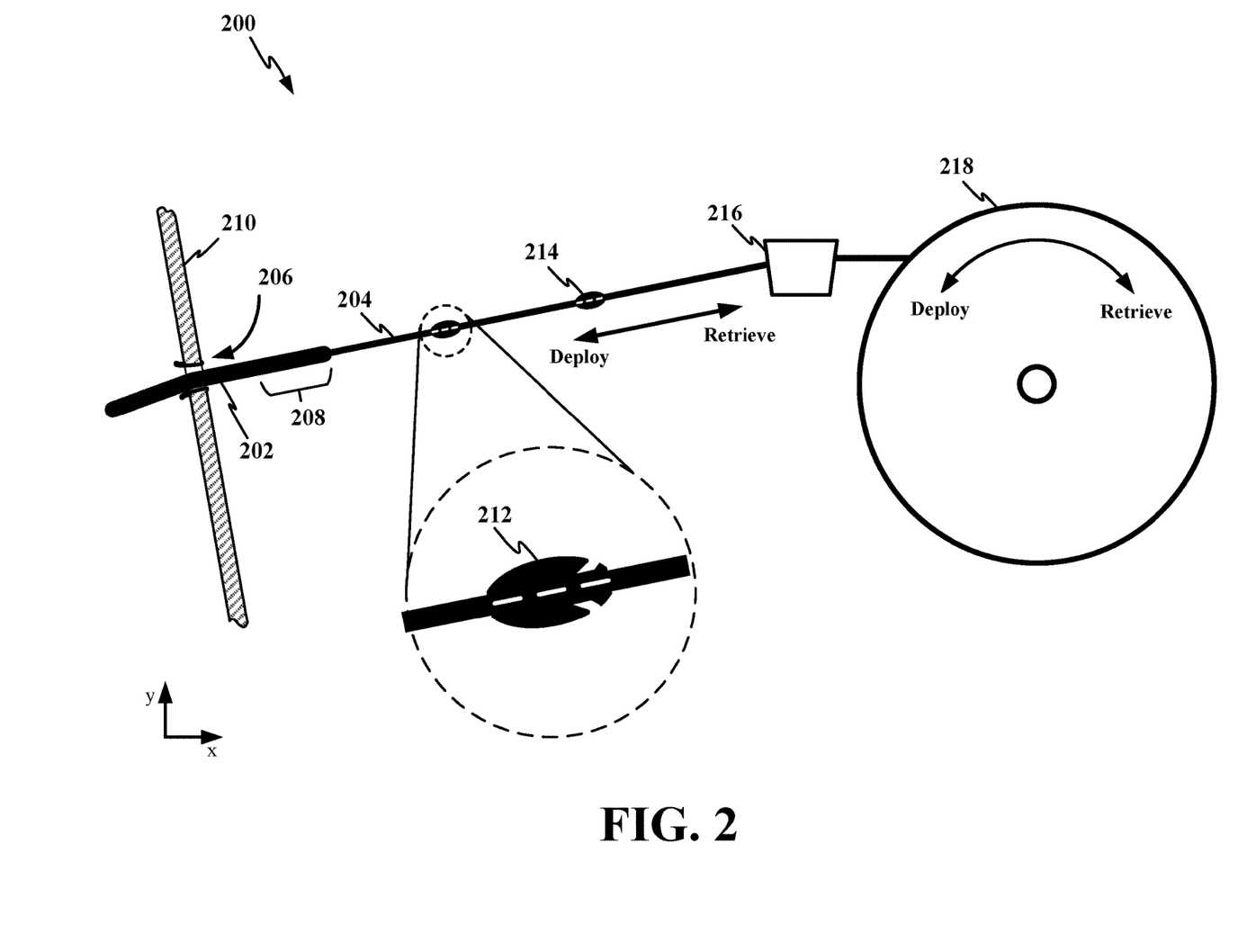
FIG. 2 is an elevation view of a towed array installation aboard a ship according to some aspects of the disclosure.

FIG. 2 is an elevation view of a towed array installation 200 aboard a ship according to some aspects of the disclosure. The towed array installation 200 may include a towed array 202, including a VIM 208, and a tow cable 204. The tow cable 204 and the towed array 202, including the VIM 208, may pass through a fairlead 206 in the stern 210 of a ship (similar to the fairlead 106 in the stern of the ship 110 of FIG. 1). The tow cable 204 and the towed array 202 including the VIM 208 may be stored on a reel 218.

A level wind 216 may operate to keep the tow cable 204 and towed array 202 level as it is being retrieved and wound onto the reel 218. In operation, the level wind 216 may travel into and out of the plane of the figure, parallel to the axis of the reel 218. The level wind 216 may be configured to evenly wind the tow cable 204 and the towed array 202 including the VIM 208 onto the reel 218 along the axis of the reel 218. The level wind 216 may also serve to prevent unwanted crossing/overlap of the tow cable 204 and towed array 202 as they are being retrieved and wound onto the reel 218. The level wind 216 serves at least the same function, but in reverse, as the towed array 202 and tow cable 204 are being deployed from the reel 218. The directions of deployment and retrieval are illustrated with double headed arrows in FIG. 2. A winch, not shown, may be used to rotate the reel 218. The level wind 216 may be operationally coupled to the winch and/or the reel 218.

Figure 3:
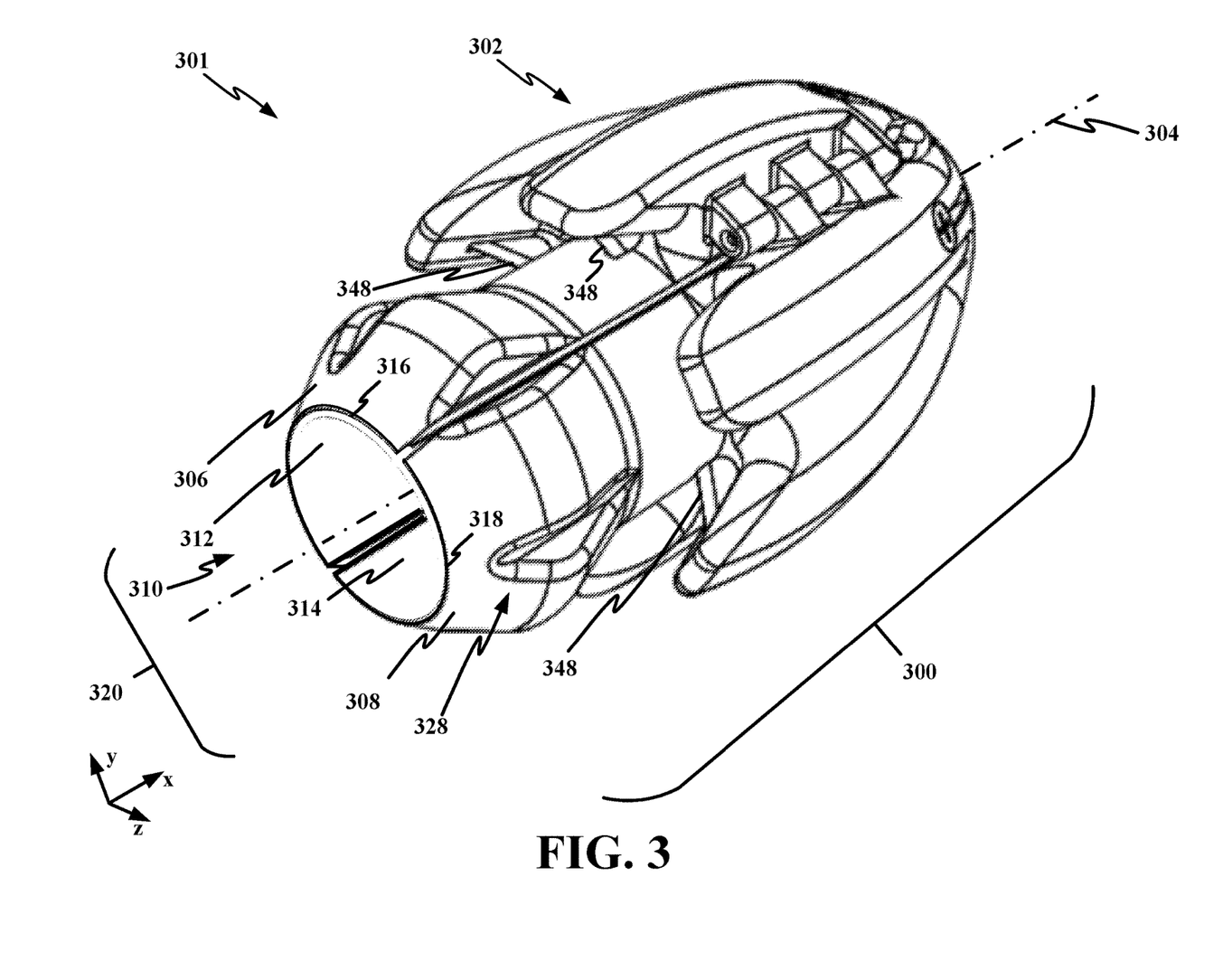
FIG. 3 is a left-front-top perspective view of a line-cutter apparatus according to some aspects of the disclosure.

Also depicted in FIG. 2 are a first line-cutter apparatus 212 (shown in an inset) and a second line-cutter apparatus 214, both mounted on (e.g., coupled to) the tow cable 204. The first line-cutter apparatus 212 and the second line-cutter apparatus 214 may be configured to be removably mounted (e.g., removably coupled) to the tow cable 204. According to some aspects, each of the first line-cutter apparatus 212 and the second line-cutter apparatus 214 may be configured as clam-shell (e.g., clam-shell-like) structure that clamps onto and about the tow cable 204 through a central opening (referred to herein as a bore 310 as shown in FIG. 3). A bore 310 may run through each of the first line-cutter apparatus 212 and the second line-cutter apparatus 214 along a longitudinal axis (also referred to in connection with FIG. 3 as a polar axis 304 of the body 300) of each of the first line-cutter apparatus 212 and the second line-cutter apparatus 214.

In an operational configuration, one or more line-cutter apparatuses may be clamped onto the tow cable 204. For example, in the illustration of FIG. 1, a first line-cutter apparatus 112, a second line-cutter apparatus 114, a third line-cutter apparatus 116, and a fourth line-cutter apparatus 118 are depicted as being clamped onto the tow cable 104, while in the example of FIG. 2, the first line-cutter apparatus 212 and a second line-cutter apparatus 214 are depicted as being clamped onto (e.g., mounted on, coupled to) the tow cable 204. According to some aspects, an outer diameter of a line-cutter apparatus may be about 2.5 inches and a length of a line-cutter apparatus may be about 4 inches. These values of diameter and length are exemplary and non-limiting. Other diameters and lengths are within the scope of the disclosure.

In practice, as a portion of the tow cable 204 is deployed from the reel 218, after passing through the level wind 216 and before passing through the fairlead 206, a sailor may close the clam-shell structure of a line-cutter apparatus 212, 214 around the tow cable 204 and secure the line-cutter apparatus 212, 214 in a closed position using, for example, a closure device, such as a cotter pin, or other type of removably fixed pin, shaft, or post, that passes through interlaced aligned knuckles of opposing shells (housings) of the clam-shell structure of the line-cutter apparatus 212, 214, for example. Other ways to secure the line-cutter apparatus 212, 214 are within the scope of the disclosure.

According to some aspects, a sailor may wrap electrical tape, or some other type of tape that may have a plasticity greater than that of a sheathing of the tow cable 204, around the tow cable 204. The sailor may then clamp the line-cutter apparatus 212, 214 over that tape and around the tow cable 204. According to some aspects, the line-cutter apparatus 212, 214 may have grip tape (e.g., 702 of FIG. 7) adhered to the inner surfaces (e.g., 312, 314 of FIG. 3) of the body (e.g., 300 of FIG. 3) of the line-cutter apparatus 212, 214. The grip tape may be suitable for underwater use and may be adhered to the inner surfaces of the line-cutter apparatus 212, 214 (e.g., adhered to the inner surfaces 312, 314 within the bore 310) prior to the coupling the line-cutter apparatus 212, 214 to the tow cable 204. An example of such grip tape may be the sort of tape used to provide a rough surface on steps beneath the surface of the water leading into a swimming pool. Another embodiment of the body 300 may have small radial protrusions formed within the bore 310 to grip the tow cable.

According to some aspects, the sheathing around a tow cable 204 may be hard and may not readily deform when the rough surface of the grip tape is clamped about the tow cable 204. However, the electrical tape, or tape with plasticity greater than that of the sheathing of the tow cable 204, may deform when the rough surface of the grip tape is clamped about the tow cable 204. Using the electrical tape, or tape with plasticity greater than that of the sheathing of the tow cable 204, may provide a greater sliding coefficient of friction than realized if no tape was wrapped around the tow cable 204. Increasing a sliding coefficient of friction may help to prevent the line-cutter apparatus 212, 214 from sliding along the tow cable 204 if, for example, flotsam, such as fishing tackle, lines, ropes, nets, trawls, or hooks, acts to drag the line-cutter apparatus 212, 214 along the tow cable 204. Of course, the preceding was only exemplary. The additional tape (e.g., electrical tape) is not required for operation of the line-cutter apparatus 212, 214. Furthermore, alternative ways to provide improved gripping strength and improving the sliding coefficient of friction are within the scope of this disclosure.

When the tow cable 204 is retrieved onto the reel 218, the sailor may remove (e.g., unclamp) each line-cutter apparatus 212, 214 from its respective location on the tow cable 204, when the line-cutter apparatus 212, 214 is again located between the fairlead 206 and the level wind 216. In some examples, adding or removing each of the line-cutter apparatuses 212, 214 described herein is determined to take only about 10 seconds.

A maximum diameter of the line-cutter apparatus 212, 214 may be less than a maximum diameter of the towed array 202 to facilitate passage of the line-cutter apparatus 212, 214 through the fairlead 206. Although not intended to be clamped about the tow cable 204 when the tow cable 204 is stored on the reel 218, the maximum diameter of the line-cutter apparatus 212, 214, may also be less than the maximum diameter of the towed array 202 to allow for temporary storage on the tow cable 204 in a scenario where the tow cable 204 and towed array 202 are retrieved onto the reel 218 in an emergency, for example. In general, according to aspects herein, the line-cutter apparatus 212, 214 may have a diameter less than that of the towed array 202; however, in any case, a maximum diameter of the line-cutter apparatus 212, 214 should allow for the line-cutter apparatus 212, 214 to pass through the fairlead 206 and any similar aperture limited structure in the level wind 216 (e.g., for emergency retrieval and storage scenarios).

In some examples, under some test conditions, a single line-cutter apparatus (e.g., similar to 212 or 214) on a tow cable (similar to 204) realized about a 70% probability of cutting target lines under test beneath the surface of water. Statistically, the probability of cutting target lines increased to about 97% when three line-cutter apparatuses were used in series. Even when reducing the probability of cutting target lines to about 30% (for a worst case statistical analysis, for example), a set of three spaced apart line-cutter apparatuses in series was found to be able to achieve about a 66% probability of successfully cutting target lines under test. The number of line-cutter apparatuses coupled to a tow cable may be 1, 2 (as in FIG. 2), 3 (as in the just-described statistical tests), 4 (as in FIG. 1), or any other number. The depiction of four and two line-cutter apparatuses in FIGS. 1 and 2, respectively, is made for illustrative and non-limiting purposes.

FIG. 3 is a left-front-top perspective view of a line-cutter apparatus 301 according to some aspects of the disclosure. In the example of FIG. 3, grip tape (e.g., grip tape 702 of FIG. 7) is not present. In the example of FIG. 3, the line-cutter apparatus 301 may include a body 300 having an outer surface 302. According to some aspects, the outer surface 302 of the body 300 may have a shape of a frusto-prolate spheroid rotated about a polar axis 304 of the body 300 as depicted in FIG. 3. One example of a prolate spheroid shape is the shape of a football. In geometry, a frustum is a portion of an object (typically a solid cone or pyramid, but in the present example a non-solid "football" shape) that lies between two parallel planes cutting through the object. As a frusto-prolate spheroid, the front and rear tips of the football are sheared off, leaving the remaining portion of the football between two parallel planes. The projection of an outline of the line-cutter apparatus 301 on a plane parallel to and spaced apart from the polar axis 304 of FIG. 3 may substantially correspond to such a shape. Other shapes, including, but not limited to frusto-ovoid, and frusto-spheroid are within the scope of the disclosure.

The exemplary frusto-prolate-spheroid shape of the line-cutter apparatus 301 may provide a benefit when clamped to (e.g., mounted on, coupled to) a tow cable. The frusto-prolate-spheroid shape may provide a gradual (non-discontinuous) incline leading to and from the line-cutter apparatus 301. The gradual incline may allow the line-cutter apparatus 301 to slide over an interior edge of the fairlead (e.g., fairlead 106 of FIG. 1) as it is being deployed from a ship and slide over an exterior edge of the fairlead as it is being retrieved into the ship. Additionally, the frusto-prolate-spheroid shape may aerodynamically slide through the aquatic medium in an operational space of the line-cutter apparatus 301 (in comparison to other shapes).

The body 300 may include at least two releasably coupled housings, for example, a first housing 306 and a second housing 308 (collectively referred to as the at least two releasably coupled housings 306, 308). The at least two releasably coupled housings 306, 308 may be fabricated by at least one of: three-dimensional printing or injection molding. In the example of FIG. 3, the releasably coupled housings are coupled together with interlaced hinge knuckles and pins (e.g., a closure pin 808 of FIG. 8 such as a cotter pin and a joint pin 908, such as a pin, rod, or shaft of FIG. 9). Other ways to releasably couple the at least two releasably coupled housings 306, 308 to one another are within the scope of the disclosure. For example, a circumferential groove can be formed in combined housings 306, 308 and linear fastener such as a zip tie can be positioned in the groove to secure the combined housings 306, 308 about tow cable 204.

The body 300, when in a closed configuration as shown in FIG. 3, may form a bore 310 defined by inner surfaces 312, 314 (collectively an inner surface 312, 314) of the body 300. According to one aspect, the bore 310 may have a bore axis (or the body 300 may have a bore axis) that is at least one of: parallel with the polar axis 304, coaxial with the polar axis 304, or not parallel with the polar axis 304. According to some aspects, a length of the body 300 along the polar axis 304 between geometric centers of the leading opening 320 and the trailing opening 406 of FIG. 4 may be greater than an equatorial diameter 614 of FIG. 6 of the body 300. By way of example, the frusto-prolate spheroid shape of the line-cutter apparatus 301 of FIGS. 3-9 may have a length of body 300 along the polar axis 304 between geometric centers of the leading opening 320 and the trailing opening 406 that is greater than an equatorial diameter 614 of the line-cutter apparatus 301.

Figure 4:
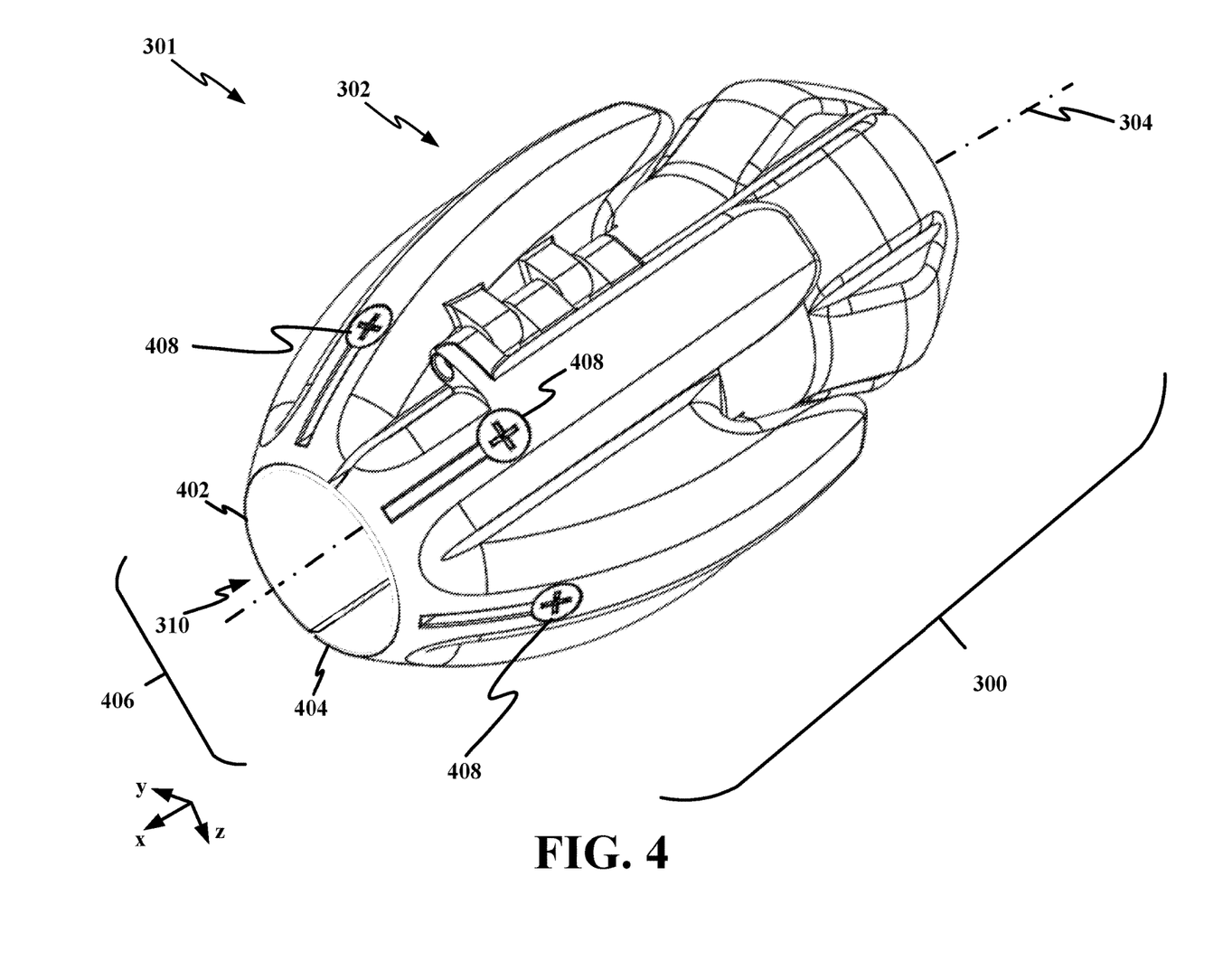
FIG. 4 is a rear-bottom-right perspective view of the line-cutter apparatus of FIG. 3 according to some aspects of the disclosure.

First edges 316, 318 (collectively a first edge 316, 318) of the outer surface 302 of the body 300 may define a leading opening 320 of the line-cutter apparatus 301. The leading opening in 320 may be coincident with the bore 310. Second edges 402, 404 of FIG. 4 (collectively referred to as the second edge 402, 404) of the outer surface 302 of the body 300 may define a trailing opening 406 of FIG. 4 of the line-cutter apparatus 301. The trailing opening 406 of FIG. 4 may be coincident with the bore 310 and spaced apart from the leading opening 320. According to the examples illustrated herein, the leading opening 320 and trailing opening 406 of FIG. 4 are parallel (in keeping with the definition of a frustrum as previously explained). However, non-parallel relationships are within the scope of the disclosure.

The line-cutter apparatus 301 may also include the following features, which will be described below in association with descriptions of the figures that follow. For example, the body 300 of the line-cutter apparatus 301 may have a plurality of longitudinal grooves formed therein that may divide the body 300 into a respective plurality of longitudinal segments. The body 300 of the line-cutter apparatus 301 may also have a plurality of passageways formed in the body 300 that correspond to respective ones of the plurality of longitudinal segments, each of the plurality of passageways defined by a floor proximal to the bore, a ceiling distal from the bore, a passageway entrance, and a passageway rear wall distal from the passageway entrance. The line-cutter apparatus 301 may further include a plurality of guard portions 328 on the body 300 that correspond to respective ones of the plurality of longitudinal segments. Each of the plurality of guard portions may be located between the leading opening and the respective passageway entrance. The line-cutter apparatus 301 may further include a plurality of fin portions on the body that correspond to respective ones of the plurality of longitudinal segments, each of the plurality of fin portions located between the respective passageway entrance and the trailing opening. The line-cutter apparatus 301 may further include a plurality of blades that correspond to respective ones of the plurality of longitudinal segments, each of the plurality of blades received within the body having a cutting edge that protrudes into one respective passageway and seats against the respective passageway rear wall.

FIG. 4 is a rear-bottom-right perspective view of the line-cutter apparatus 301 of FIG. 3 according to some aspects of the disclosure. In the example of FIG. 4, grip tape (e.g., grip tape 702 of FIG. 7) is not present. Depicted in FIG. 4 are the body 300, the outer surface 302 of the body 300, the polar axis 304, and the bore 310. Also depicted are the second edge 402, 404 of the outer surface 302 of the body 300. The second edge 402, 404 of the outer surface 302 of the body 300 may define the trailing opening 406 of the line-cutter apparatus 301. The second edge 402, 404 of the outer surface 302 of the body 300 may be coincident with the bore 310 and the trailing opening 406 may be spaced apart from the leading opening 320 of FIG. 3. Also identified in FIG. 4 are a plurality of screws 408. Each respective one of the plurality of screws 408 may fix a respective blade 348 of FIG. 3 in an operational configuration of the line-cutter apparatus 301. Blades 348 may be fabricated from metal. Selection of the type of metal (e.g., stainless steel, hardened) may be based on the knowledge of one of skill in the art.

Figure 5:
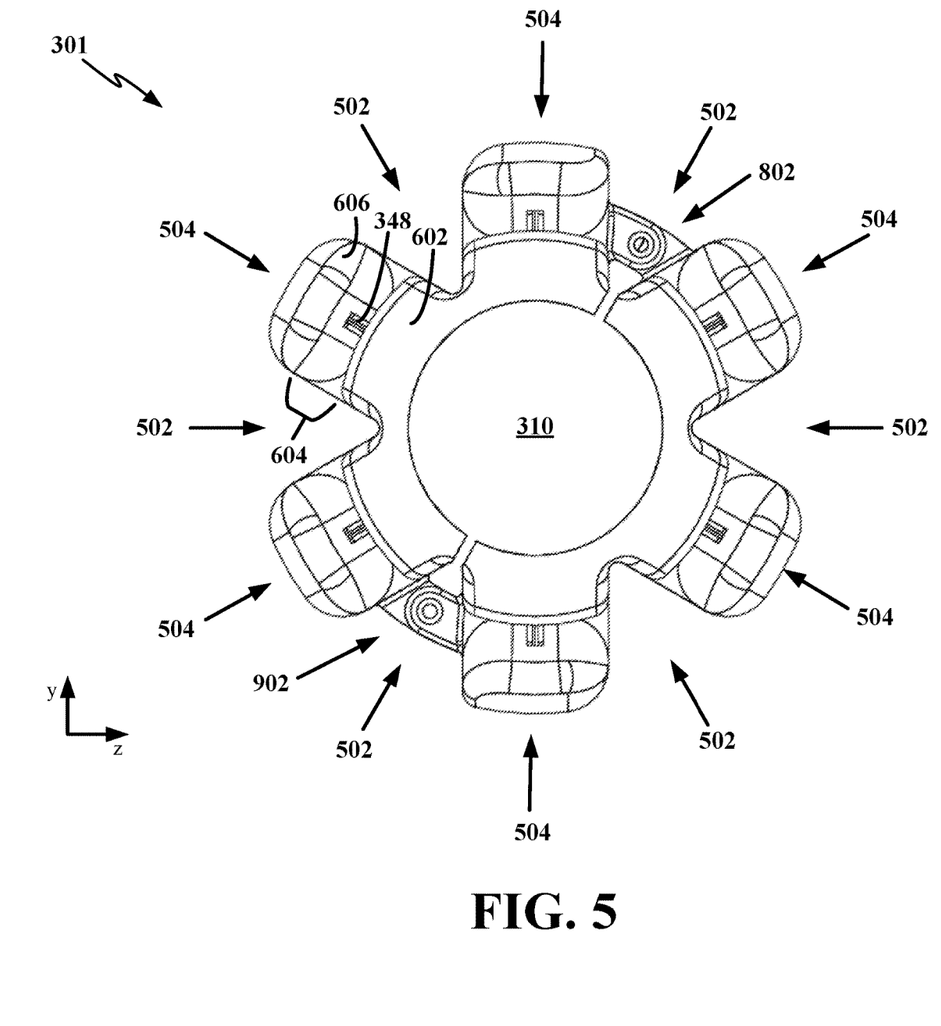
FIG. 5 is a left-side view of the line-cutter apparatus of FIG. 3 according to some aspects of the disclosure.

FIG. 5 is a left-side view of the line-cutter apparatus 301 of FIG. 3 according to some aspects of the disclosure. In the example of FIG. 5, grip tape (e.g., grip tape 702 of FIG. 7) is not present. In an operational state, the line-cutter apparatus 301 would receive a tow cable (e.g., tow cable 204 of FIG. 2) within the bore 310 and would be pulled toward the viewer (in a direction pointing out of the plane of drawing sheet toward the viewer). Flotsam, such as a fishing tackle, lines, ropes, nets, trawls, or hooks, for example, may be pulled into a passageway 604 and may be cut by the blade 348 at a rear zone (e.g., 718 of FIG. 7) of the passageway 604. Also visible in the illustration of FIG. 5 are the left-side views of the first hinge 802 (e.g., a hinge used for securing the line-cutter apparatus 301 clam-shell structure halves closed) and second hinge 902 (e.g., a hinge about which the clam-shell structure halves rotate open or closed).

As indicated in FIG. 5, the body 300 of the line-cutter apparatus 301 may have a plurality of longitudinal grooves 502 formed therein that may divide the body 300 (e.g., the first housing 306 and the second housing 308) into a respective plurality of longitudinal segments 504. Each of the plurality of longitudinal segments 504 may have sides perpendicular to a plane tangent to the outer surface 302 of the longitudinal segment 504 and parallel with the polar axis 304. Other configurations are within the scope of the disclosure. Hinge knuckles may be formed on a first side and a second side of certain spaced apart ones of the plurality of longitudinal segments 504.

Each of the plurality of longitudinal segments 504 may include a guard portion 602, a passageway 604, and a fin portion 606. Each one of a plurality of blades 348 may occupy the rear zone (e.g., 718 of FIG. 7) of one respective passageway 604 as illustrated in the exemplary and non-limiting geometries of FIG. 5. Only one of six guard portions 602, one of six passageways 604, one of six fin portions 606, and one of six blades 348 are identified with reference numbers in FIG. 5 to avoid cluttering the drawing. According to some aspects, the plurality of longitudinal grooves 502 may reduce at least one of: an amount of material used to fabricate the line-cutter apparatus 301 (e.g., by three-dimensional printing or injection molding), or an amount of time needed to fabricate the line-cutter apparatus 301 using three-dimensional printing. (Of course, the apparatus could be formed by conventional machining.) According to some aspects, each of a respective fin portion 606 formed between adjacent pairs of the plurality of longitudinal grooves 502 may define each of the plurality of longitudinal grooves 502 in a configuration to facilitate entrance of flotsam (e.g., fishing tackle, lines, ropes, nets, trawls, or hooks) into a respective passageway 604. In one example, the plurality of longitudinal grooves 502 may provide improved fluid flow of the aquatic medium as that medium passes through the plurality of longitudinal grooves 502 on both sides of respective ones of the plurality of blades 348.

Figure 6:
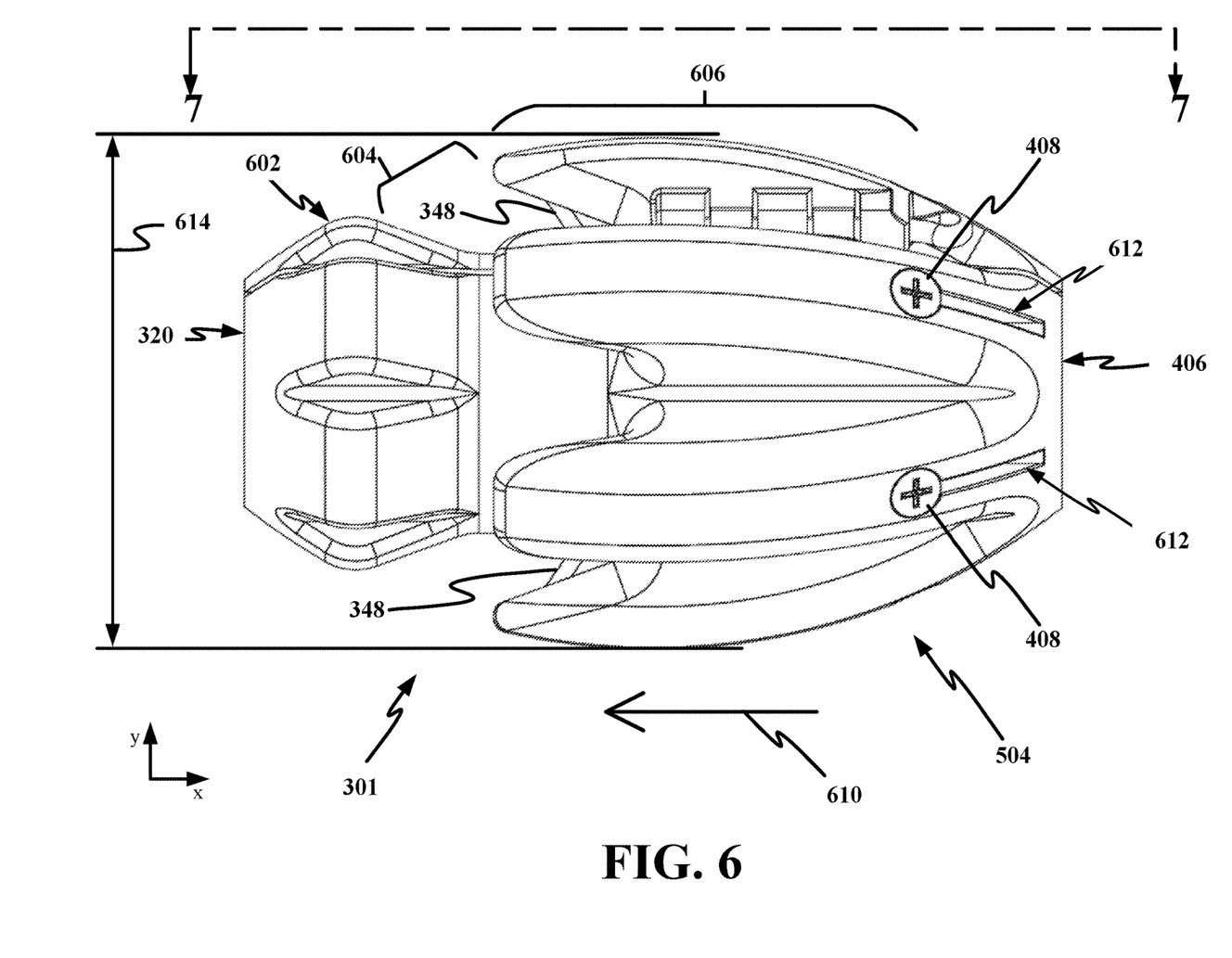
FIG. 6 is a front view of the line-cutter apparatus of FIG. 3 according to some aspects of the disclosure.

FIG. 6 is a front view of the line-cutter apparatus 301 of FIG. 3 according to some aspects of the disclosure. The leading opening 320 is identified at the left of the illustration, the trailing opening 406 is identified at the right of the illustration. In an operational state, the line-cutter apparatus 301 may be pulled through the aquatic medium in the direction of arrow 610.

As described in connection with FIG. 5, each of the plurality of longitudinal segments 504 may include a guard portion 602, a passageway 604, and a fin portion 606. A plurality of blades 348 each occupy a respective rear zone (e.g., 718 of FIG. 7) of one respective passageway 604. One or more of the guard portions 602 may be at least one of: solid, hollow, or bridge-like (e.g., having an open through-space below a peak of the guard portion 602). One or more of the fin portions 606 may be at least one of: solid, hollow, or bridge-like. According to aspects of the disclosure, each fin portion 606 may include a channel (e.g., 720 of FIG. 7) that may be formed as a slot and may be configured to receive a respective blade 348. Two of a plurality of channel openings 612 are depicted in FIG. 6. Two of the plurality of screws 408 are depicted in an engaged operational state (e.g., secured against blades seated in the channel 720 of FIG. 7), at or below the outer surface 302 of the body 300 of the line-cutter apparatus 301.

Figure 7:
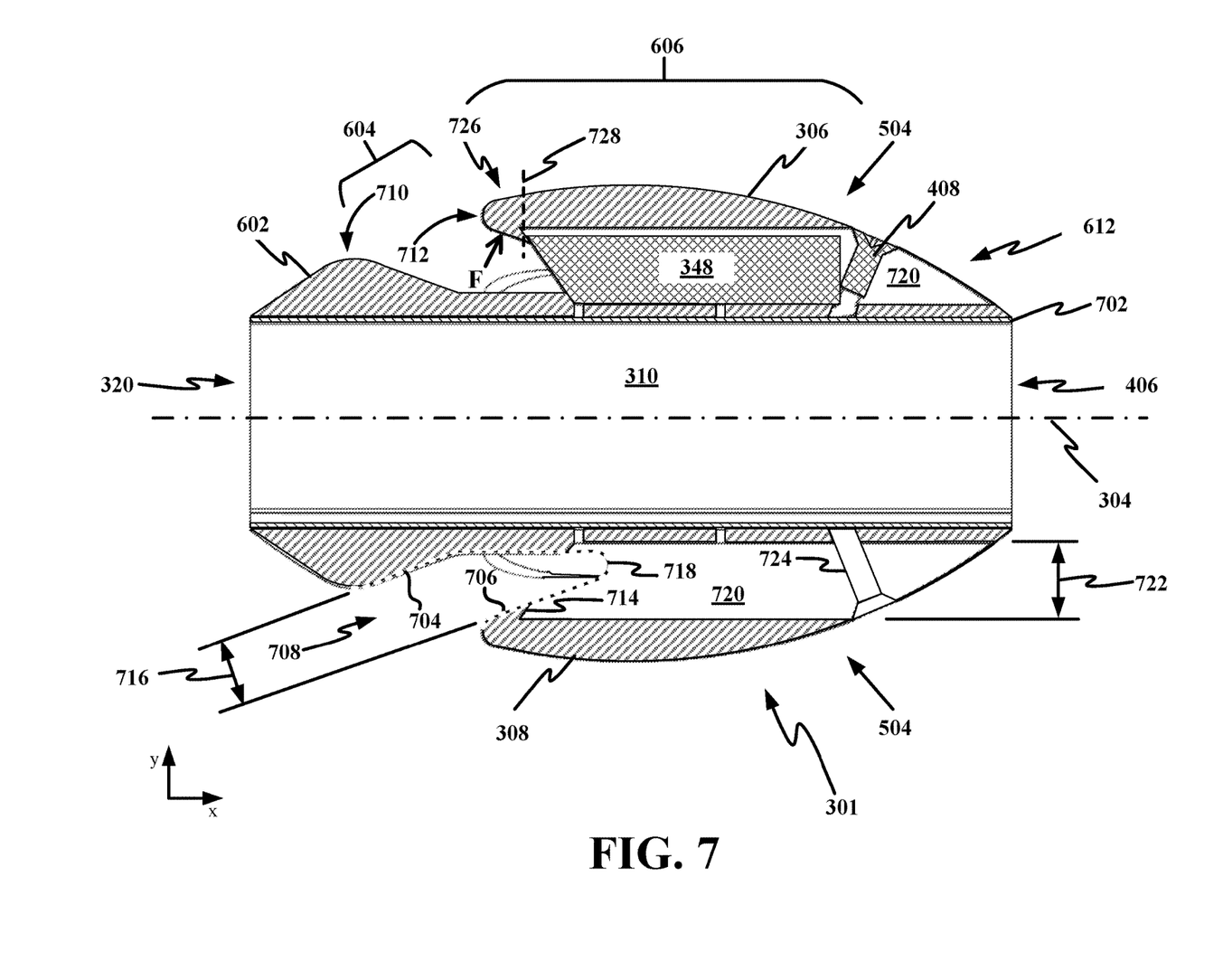
FIG. 7 is a cross-section, taken along the plane 7-7 identified in FIG. 6, of the line-cutter apparatus of FIG. 3, according to some aspects of the disclosure.

FIG. 7 is a cross-section, taken along the plane 7-7 identified in FIG. 6, of the line-cutter apparatus 301 of FIG. 3, according to some aspects of the disclosure. The leading opening 320 is identified at the left of the illustration, the trailing opening 406 is identified at the right of the illustration. In the example of FIG. 7, grip tape 702 is depicted for illustrative and non-limiting purposes.

A plurality of passageways 604 formed in the body of the line-cutter apparatus 301 may correspond to respective ones of the plurality of longitudinal segments 504. Each of the plurality of passageways 604 may be defined by a floor 704 proximal to the bore 310, a ceiling 706 distal from the bore 310, a passageway entrance 708, and a passageway 604 rear wall 714 distal from the passageway entrance 708. The passageway 604 rear wall 714 may be distal from the passageway entrance 708 and may be shared with a channel 720 within which a blade 348 is received. The passageway entrance 708 may be defined by a third edge 710 and a fourth edge 712. According to some aspects, the third edge 710 may be located between the outer surface of the guard portion 602 and the floor 704 of the passageway 604 proximal to the leading opening 320. According to some aspects, the fourth edge 712 may be located between the outer surface 302 of the fin portion 606 and the ceiling 706 distal from the leading opening 320. The third edge 710 and the fourth edge 712 may have a defined peak, or, as in the example of FIG. 7, a non-defined (e.g., curved) peak. Other geometries are within the scope of the disclosure.

According to some aspects, a respective one of the plurality of guard portions 602 and a corresponding respective fin portion 606 may be spaced apart by a longitudinal distance corresponding to a predetermined distance D 716, and the predetermined distance D 716 may be less than a diameter of an average human finger. In other words, the third edge 710 may be spaced apart from the fourth edge 712 by the predetermined distance D 716. The predetermined distance D 716 may be based on a diameter of an average human finger (e.g., an average male finger diameter, an average female finger diameter, or an average of the averages of the male and female finger diameters). According to some aspects, the diameter of an average human finger may be about 0.5 inches, although other diameters are within the scope of the disclosure. The predetermined distance D 716 may be selected to be less than the diameter of the average human finger to prevent accidental insertion of the average human finger into the passageway 604 where it may be cut by the blade 348. While the predetermined distance D 716 according to some aspects may be less than the average human finger diameter, it should not be made so small as to reduce a probability that flotsam, intended to be cut by the blade 348, is unable to enter the passageway 604 through the passageway entrance 716. Therefore, a tradeoff may be made during design and manufacture of the line-cutter apparatus 301 as to a minimum size of the predetermined distance D 716 in view of possibly competing goals of injury prevention during handling and probability of successfully cutting target objects, such as flotsam (e.g., fishing tackle, lines, ropes, nets, trawls, or hooks).

FIG. 7 depicts cross-sections of two of the plurality of guard portions 602 on the body of the line-cutter apparatus 301. Each of the plurality of guard portions 602 may correspond to respective ones of the plurality of longitudinal segments 504, each of the plurality of guard portions 602 may be located between the leading opening 320 and the respective passageway entrance 708 located between the leading opening 320 and a respective one of the plurality of passageway entrances 708. FIG. 7 also depicts cross-sections of two fin portions 606 on the body of the line-cutter apparatus 301. Each fin portion 606 may correspond to respective ones of the plurality of longitudinal segments 504, each fin portions 606 may be located between the respective passageway entrance 708 and the trailing opening 406.

The cross-sectional plane of FIG. 7 passes through the first housing 306 at the top of the illustration and through the second housing 308 at the bottom of the illustration. In FIG. 7, one of the plurality of blades 348 is omitted to allow viewing of one of a respective plurality of channels 720 that may be defined by sidewalls within the body 300 (or equivalently expressed as one of a respective plurality of channels 720 that may be defined by sidewalls within one of the at least two releasably coupled housings 306, 308). In other words, the body 300 of the line-cutter apparatus 301 may have a plurality of channels 720 formed therein. Each of the plurality of channels 720 may be configured to receive a respective one of the plurality of blades 348 through a respective channel opening 612 defined by edges of the outer surface 302 of the body 300.

Each of the plurality of channels 720, that may be defined by sidewalls within the body (or housing), may be configured to receive a respective one of the plurality of blades 348 and share the respective passageway 604 rear wall 714 and an opening, defined by edges of the rear wall 714, between the passageway 604 and the channel 720. Each of the respective plurality of blades 348 may be received through a respective channel opening 612 defined by edges of the outer surface 302 of the body 300, or of the at least two releasably coupled housings 306, 308. According to some aspects, the channel opening 612 may have a height H 722 that may be sufficient to allow passage of the blade 348 yet not so great as to allow unwanted travel of the blade 348 within the channel 720.

FIG. 7 depicts one example (in dashed line) of a curvature of the floor 704 and ceiling 706 in the passageway 604 rear zone 718. As exemplified, the rear zone 718 extends into the channel 720, which allows the blade 348, in turn, to extend into the passageway 604. Use of this configuration may allow each of the plurality of blades 348 received within respective ones of the plurality of channels 720 to have a cutting edge of the blade 348 protrude into one respective passageway 604 and seat against the respective passageway 604 rear wall 714, shared by the one respective passageway 604 and the channel 720.

According to some aspects, a blade 348 may be received, through a channel opening defined by edges of the outer surface 302, into a channel 720 defined by sidewalls within the body 300 (or within at least one of the at least two releasably coupled housings 306, 308). The channel 720 may be configured to slidingly receive the blade 348 in at least one of: a direction parallel to the polar axis 304 or a direction perpendicular to the polar axis 304. That is, the exemplary line-cutter apparatus 301 illustrated and described in FIGS. 3-9 depicts the channel opening 612 as being located adjacent to the trailing opening 406, where the blade 348 enters the channel 720 by sliding into the channel 720 in a direction parallel to the polar axis 304, from the trailing opening 406 side of the line-cutter apparatus 301 toward the leading opening 320 side of the line-cutter apparatus 301. This may be one example. According to another example (not shown) the channel opening may be located in the fin portion 606, perpendicularly spaced apart from the polar axis 304, and the blade 348 may enter the channel 720 by sliding in a direction perpendicular to the polar axis 304, from an outermost equatorial diameter of the line-cutter apparatus 301 toward the polar axis 304.

According to some aspects, the plurality of screws 408 may each corresponding to a respective one of the plurality of blades 348. In one example, the each of the plurality of screws 408 may be self-threading. According to some aspects, each of the plurality of screws may be configured to releasably fix a respective blade 348 in a respective channel 720. In other words, each of the plurality of screws may be configured to releasably fix a respective blade 348 in the body. In some examples, an outermost surface of a head of the screw 408 may be proximate to (e.g., at or below) the outer surface 302 of the body 300. A screw bore hole 724 having a diameter substantially similar to the minimum thread diameter of the screw 408 may be provided to receive the screw 408.

According to some aspects, each of the first housing 306 and second housing 308 may be printed using a three-dimensional (3D) printer. Three-dimensional printing may add layers to the mass of the component being printed. The layers may be referred to as slices. The 3D printing may be performed, for example, by building each of the first housing 306 and second housing 308 from the second edge 402, 404 of the trailing opening 406 toward the first edge 316, 318 of the leading opening 320, or from the first edge 316, 318 of the leading opening 320 toward the second edge 402, 404 of the trailing opening 406. Using the orientation of FIG. 7 as an example. successive slices may be added to the y-z plane, atop one another, and building up in the x axis direction.

Some examples of materials that may be used to fabricate the line-cutter apparatus 301 using a 3D printer include, for example, 3D printable thermo-plastics such as nylon, polyester, and/or acrylonitrile butadiene styrene-electrostatic dissipative (ABS-ESD) (e.g., ABS-ESDI, which is one example of durable thermoplastic with static dissipative properties), 3D printable organic material such as 3D printable bamboo, and/or 3D printable metals. In some examples, the material selected to fabricate the line-cutter apparatus 301 may be selected based, at least in part, on the hardness of the material. For example, the body 300 of the line-cutter apparatus 301 may be made of a material that slides over a surface of a fairlead (e.g., 106 of FIG. 1) through which the line-cutter apparatus 301 slides without marring. That is, the body 300 of the line-cutter apparatus 301 may be made of a material that does not mar a surface of a fairlead through which the line-cutter apparatus 301 slides during deployment and retrieval of the line-cutter apparatus 301.

In 3D printing, an object may be formed by layering slices of material atop one another. According to one aspect, the body 300 (e.g., at least one of the at least two releasably coupled housings 306, 308) of the line-cutter apparatus 301 may be formed using a 3D printing process by layering slices of material atop one another in the y-z plane. This process, in this orientation, may produce an unexpected result, which may be a feature of the fin portion 606.

According to one example of such a feature, a fin tip 726 of a respective fin portion 606 may be constructed (e.g., configured) to break away from the respective fin portion 606 along a break-away plane 728 in the y-z plane. A parameter that may quantify the force required for the break may be referred to as a bending stress force. According to some aspects, a rated bending stress force of each fin tip 726 may be configured to be less than a minimum ripping force of a uniform that is typically used by personnel handling (e.g., deploying, retrieving, or both) a towed array such as the towed array 202 and the attendant tow cable 204 of FIG. 2. According to some examples, the ripping force for uniform fabrics may be rated at about 200 pounds. Constructing the fin portion 606 such that a fin tip 726 of a respective fin portion 606 breaks away from the fin portion 606 when a bending force applied to the fin tip 726 is less than the ripping force of the uniform may reduce a probability of the fin tip 726 snagging on and tearing a uniform, or of the fin tip 726 snagging on the uniform and pulling or dragging the sailor when the line-cutter apparatus 301 is mounted on a tow cable and moving with the tow cable.

A direction of an outward force, F, is graphically represented in FIG. 7. In some examples, the outward force, F, may represent the bending force applied to the fin tip 726. According to some aspects, a plurality of fin portions 606 may be constructed to allow (or to cause) a fin tip 726 to break away from one of the plurality of fin portions 606 when an outward force, less than a predetermined value (e.g., less than a predetermined magnitude of force), is applied to the fin tip 726. In other words, a maximum rated bending force of a fin tip 726 may be less than the predetermined value. According to such aspects, the predetermined value may be less than a minimum ripping force of a uniform (e.g., a textile article of manufacture worn by personnel). In one example, the predetermined value may be set at (e.g., designed into a 3D printed line-cutter apparatus by selection of one or more materials and 3D printing parameters known to one of skill in the art) about 150 psi for a corresponding minimum ripping force of about 200 psi. Other values of the predetermined value, the minimum ripping force, and of a margin between the predetermined value and the minimum ripping force are within the scope of the disclosure.

Figure 8:
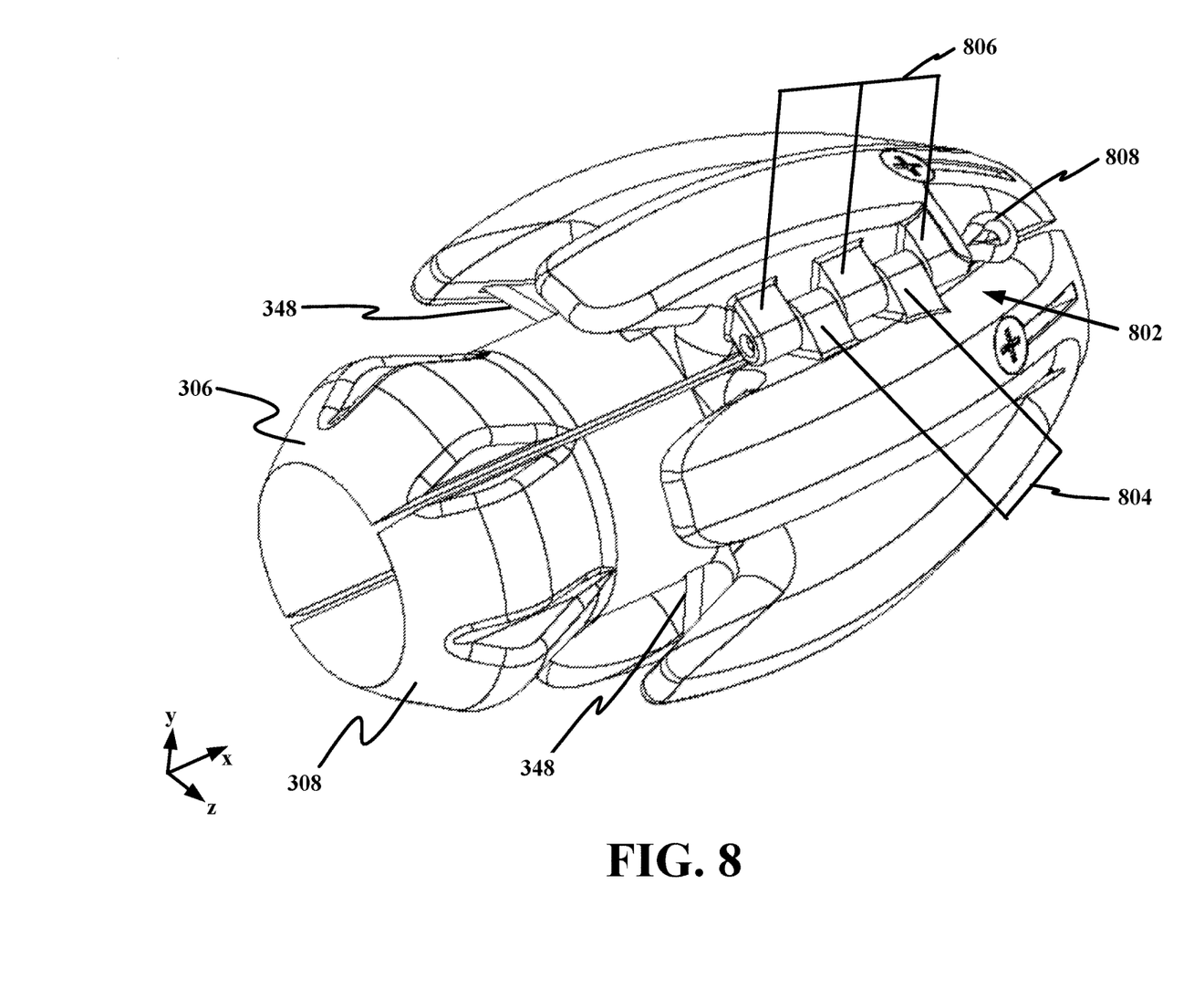
FIG. 8 is an alternate shaded representation of the left-front-top perspective view of the line-cutter apparatus of FIG. 3 according to some aspects of the disclosure.
Figure 9:
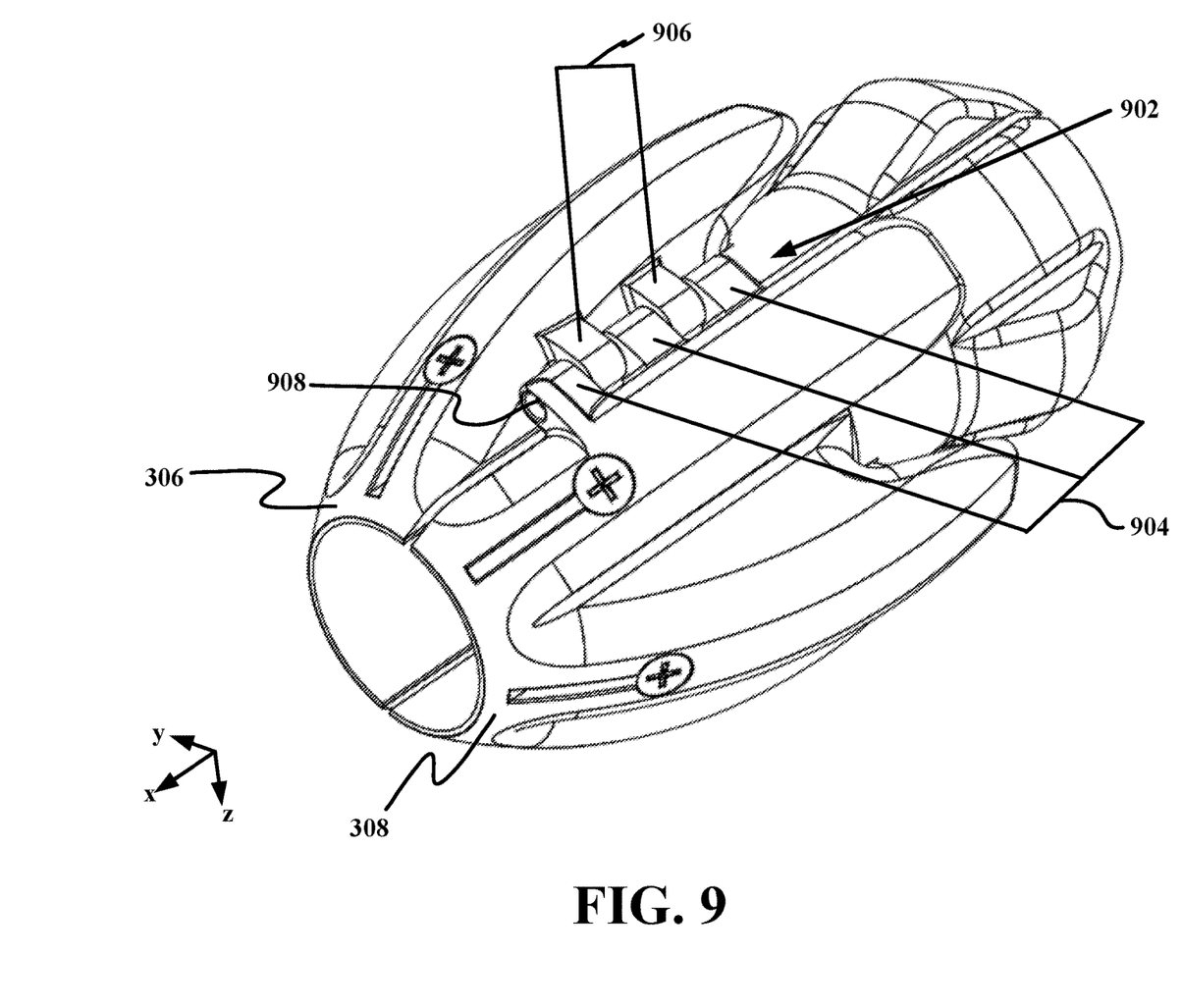
FIG. 9 is an alternate shaded representation of the rear-bottom-right perspective view of the line-cutter apparatus of FIG. 4 according to some aspects of the disclosure.

FIG. 8 is an alternate shaded representation of the left-front-top perspective view of the line-cutter apparatus 301 of FIG. 3 according to some aspects of the disclosure. FIG. 9 is an alternate shaded representation of the rear-bottom-right perspective view of the line-cutter apparatus 301 of FIG. 4 according to some aspects of the disclosure. The configurations may be referred to as at least two releasably coupled housings. According to the example of FIGS. 8 and 9, the at least two releasably coupled housings may include a first housing 306 and an opposing second housing 308 that may be configured as a clam-shell structure. The coupling may be achieved using, for example, a first hinge 802 (that may be referred to as a closure) and a second hinge 902 (that may be referred to as a joint). The following description considers an observation of the line-cutter apparatus 301 of FIG. 3 with the cotter pin (closure pin 808) removed and the line-cutter apparatus 301 opened (rotated open about the joint pin 908) so that the observer is looking toward the inner surfaces of the at least two releasably coupled housings 306, 308 with the first housing 306 on the left and the second housing 308 on the right.

In greater detail, the at least two releasably coupled housings 306, 308 may include a closure pin 808, a joint pin 908, a first plurality of longitudinally spaced apart first hinge knuckles 804 formed at a first side of the first housing 306 and configured to removably receive the closure pin 808, a second plurality of longitudinally spaced apart second hinge knuckles 904 formed at a second side of the first housing 306 and configured to fixedly receive the joint pin 908, a third plurality of longitudinally spaced apart third hinge knuckles 906 formed at a first side of the second housing 308, interlaced with the second hinge knuckles 904 and having the joint pin 908 fixedly received in the second hinge knuckles 904 and rotatably received in the third hinge knuckles 906, a fourth plurality of longitudinally spaced apart fourth hinge knuckles 806 formed at a second side of the second housing 308 and configured to interlace with the first hinge knuckles 804 and have the closure pin 808 releasably fixed through the first hinge knuckles 804 and the fourth hinge knuckles 806.

According to some aspects, where the at least two releasably coupled housings 306, 308 may be configured as a closed clam-shell structure secured about the tow cable (e.g., 204 of FIG. 2) and having the fourth hinge knuckles 806 interlaced with the first hinge knuckles 804 and having the closure pin 808 releasably fixed through the fourth hinge knuckles 806 and the first hinge knuckles 804 (that is, for example, having a cotter pin inserted to the hinge and preventing the clam-shell structure from springing open), the at least two releasably coupled housings grip the tow cable without sliding in the direction of the polar axis 304 (of the line-cutter apparatus 301).

According to some aspects, a diameter of the bore 310 may be specified to provide a friction fit between the body 300 and the tow cable (e.g., 204 of FIG. 2) secured within the bore 310. Grip tape (e.g., 702 of FIG. 7) may be used to increase the sliding coefficient of friction between the line-cutter apparatus 301 and the tow cable. Electrical tape may be wrapped around the tow cable to provide a greater sliding coefficient of friction between the line-cutter apparatus 301 and the tow cable. As the line-cutter apparatus 301 may be designed to maximize its grip on the tow cable, a line-cutter apparatus 301 that is closed and secured with a pin, such as a cotter pin, may be applying a continuous force on the halves of the line-cutter apparatus 301 that tends to bias the line-cutter apparatus 301 toward springing open. This bias may act to hold the pin in place without having to secure the pin (such as by bending any portion of the cotter pin extending out from the hinge). In operation, the cotter pin may be slidably inserted into the knuckles of the hinge and may be slidably removed from the knuckles of the hinge with a pliers, for example.

Figure 10:
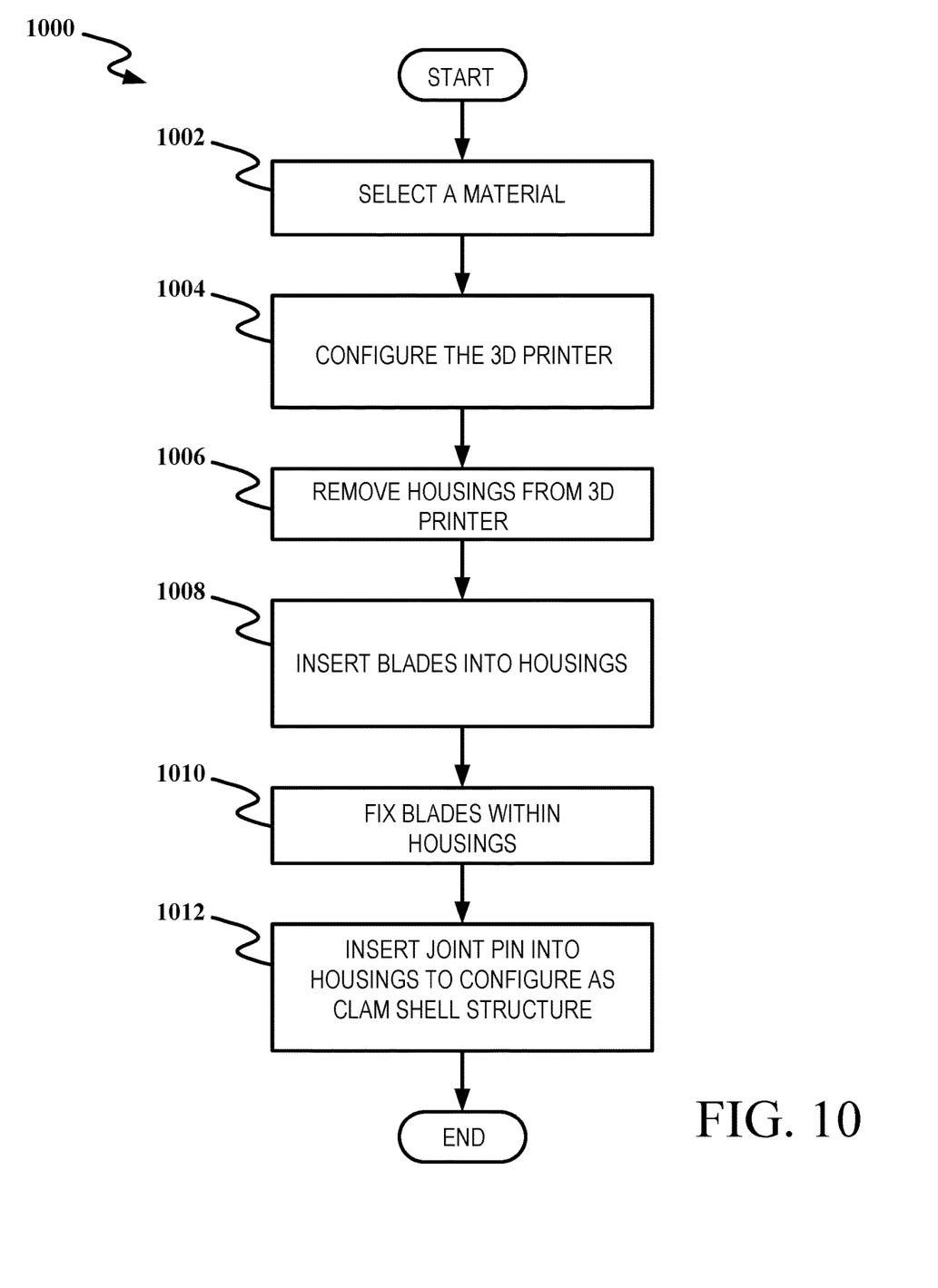
FIG. 10 is a block diagram describing a method of manufacture of a line-cutter apparatus according to some aspects of the disclosure.

FIG. 10 is a block diagram describing a method of manufacture 1000 of a line-cutter apparatus (similar to the line-cutter apparatus 301 of FIG. 3, for example) according to some aspects of the disclosure. The method of manufacture of the line-cutter apparatus may include, at block 1002, selecting a material to use to fabricate the line-cutter apparatus on a 3D printer. As used herein, the reference to a 3D printer encompasses one or more 3D printers. At block 1004, the method may include configuring the 3D printer to print, and printing, the line-cutter apparatus on the 3D printer as at least two housings. At block 1006, the method may include removing the at least two housings from the 3D printer. The at least two housings may be printed individually (e.g., at different 3D printers or at separate times on the same 3D printer) or collectively. At block 1008, the method may include inserting, into the at least two housings, a plurality of blades into a respective plurality of channels configured to receive the plurality of blades. At block 1010, the method may include fixing the plurality of blades within the respective plurality of channels. According to some aspects, the plurality of blades may be fixed within the plurality of channels using at least one of: an adhesive, a screw, or a pin. At block 1012, the method may include fixedly inserting a joint pin into a joint shared by the at least two housings to configure the line-cutter apparatus as a clam-shell structure. According to one example, the joint may be configured from interlaced aligned knuckles of the first housing 306 and the second housing 308 (e.g., opposing shells or housings).

According to some aspects, configuring the 3D printer to print, and printing the line-cutter apparatus on the 3D printer, may cause the 3D printer to print: a body having an outer surface and having at least two releasably coupled housings, a bore defined by an inner surface of the body, a first edge of the outer surface defining a leading opening coincident with the bore, and a second side of the outer surface defining a trailing opening coincident with the bore and spaced apart from the leading opening, where the body may have a plurality of longitudinal grooves formed in the body that may divide the body into a respective plurality of longitudinal segments, and where the body may have a plurality of passageways formed in the body that each correspond to respective ones of the plurality of longitudinal segments, each of the plurality of passageways defined by a floor proximal to the bore, a ceiling distal from the bore, a passageway entrance, and a passageway rear wall distal from the passageway entrance, a plurality of guard portions on the body that correspond to respective ones of the plurality of longitudinal segments, each of the plurality of guard portions located between the leading opening and the respective passageway entrance, and a plurality of fin portions on the body that correspond to respective ones of the plurality of longitudinal segments, each of the plurality of fin portions located between the respective passageway entrance and the trailing opening.

According to some aspects, inserting, into the line-cutter apparatus, the plurality of blades may cause each of the plurality of blades to be received within the body. The method may further include causing a cutting edge of the blade to protrude into one respective passageway and to seat against the respective passageway rear wall.

One or more of the components, processes, features, and/or functions illustrated in FIGS. 1-9 and/or 10 may be rearranged and/or combined into a single component, process, feature, or function or embodied in several components, processes, or functions. Additional elements, components, processes, and/or functions may also be added without departing from the disclosure.

The word "exemplary" is used herein to mean "serving as an example, instance, or illustration." Any implementation or aspect described herein as "exemplary" is not necessarily to be construed as preferred or advantageous over other implementations or aspects described herein.

Likewise, the term "aspects" does not require that all aspects of the disclosure include the discussed feature, advantage, or mode of operation.

The term "coupled" is used herein to refer to the direct or indirect coupling between two objects. For example, if object A physically touches object B, and object B touches object C, then objects A and C may still be considered coupled to one another—even if they do not directly physically touch each other.

The word "coincident" may be used herein to mean "occurring together in space." As used herein, a "segment" may be one of the constituent parts into which a body, entity, or quantity is divided. As used herein, a "pin" may be a rod, such as a rod running the length of a hinge. The pin may hold the leaves of the hinge together or secure one object to another object.

As used herein, the construct "at least one of: A, B, or C" means A, B, C, AB, AC, BC, or ABC. The construct "A and/or B" means A, B, or AB. The construct "A, B, and/or C" means A, B, C, AB, AC, BC, or ABC.

Also, it is noted that various disclosures contained herein may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed.

While the foregoing disclosure shows illustrative example, it should be noted that various changes and modifications could be made herein without departing from the scope of the disclosure as defined by the appended claims. The functions, steps and/or actions of the method claims in accordance with the features described herein need not be performed in any particular order. Furthermore, although elements of features may be described or claimed in the singular, the plural is contemplated unless limitation to the singular is explicitly stated.

The previous description of the disclosed features is provided to enable any person skilled in the art to make or use the present invention. Various modifications to these features will be readily apparent to those skilled in the art, and the generic principles defined herein may be applied to other features without departing from the spirit or scope of the invention. Thus, the present invention is not intended to be limited to the features shown herein but is to be accorded the widest scope consistent with the principles and novel features disclosed herein.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular features of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A line-cutter apparatus capable of being mounted on a tow cable, comprising:
   a body having an outer surface and comprised of at least two releasably coupled housings, a bore defined by an inner surface of the body, a first edge of the outer surface defining a leading opening coincident with the bore, and a second edge of the outer surface defining a trailing opening coincident with the bore and spaced apart from the leading opening;
   wherein the body has a plurality of longitudinal grooves formed therein that divide the body into a respective plurality of longitudinal segments;
   wherein the body has a plurality of passageways formed therein that correspond to respective ones of the plurality of longitudinal segments, each of the plurality of passageways defined by a floor proximal to the bore, a ceiling distal from the bore, a passageway entrance, and a passageway rear wall distal from the passageway entrance;
   a plurality of guard portions on the body that correspond to respective ones of the plurality of longitudinal segments, each of the plurality of guard portions located between the leading opening and the respective passageway entrance;
   a plurality of fin portions on the body that correspond to respective ones of the plurality of longitudinal segments, each of the plurality of fin portions located between the respective passageway entrance and the trailing opening; and
   a plurality of blades that correspond to respective ones of the plurality of longitudinal segments, each of the plurality of blades received within the body having a cutting edge that protrudes into a respective one of the plurality of passageways and seats against the respective passageway rear wall.

2. The apparatus of claim 1, wherein the outer surface of the body has a shape of a frusto-prolate spheroid rotated about a polar axis of the body.

3. The apparatus of claim 1, wherein the at least two releasably coupled housings of the body are fabricated by at least one of: three-dimensional printing, or injection molding.

4. The apparatus of claim 1, wherein a respective one of the plurality of guard portions and a corresponding respective one of the plurality of fin portions are spaced apart by a longitudinal distance corresponding to a predetermined distance, and the predetermined distance is less than a diameter of an average human finger.

5. The apparatus of claim 1, wherein the plurality of longitudinal segments each have sides perpendicular to a plane tangent to the outer surface of the body and parallel with a polar axis of the body.

6. The apparatus of claim 1, wherein the plurality of longitudinal grooves reduces at least one of: an amount of material used to fabricate the apparatus, or an amount of time needed to fabricate the apparatus using three-dimensional printing.

7. The apparatus of claim 1, wherein each of a respective fin portion formed between adjacent pairs of the plurality of longitudinal grooves defines each of the plurality of longitudinal grooves in a configuration to facilitate entrance of flotsam into a respective one of the plurality of passageways.

8. The apparatus of claim 1, wherein the plurality of fin portions are constructed to allow a fin tip to break away from one of the plurality of fin portions when an outward force, less than a predetermined value, is applied to the fin tip.

9. The apparatus of claim 1, wherein the body has a bore axis that is at least one of: parallel with a polar axis of the body, coaxial with the polar axis of the body, or not parallel with the polar axis of the body.

10. The apparatus of claim 1, wherein a length of the body along a polar axis between geometric centers of the leading opening and the trailing opening is greater than an equatorial diameter of the body.

11. The apparatus of claim 1, wherein:
the body has a plurality of channels formed therein, each of the plurality of channels configured to receive a respective one of the plurality of blades and share the respective passageway rear wall and an opening defined by edges of the rear wall between the passageway and the channel.

12. The apparatus of claim 1, wherein:
the body has a plurality of channels formed therein, each of the plurality of channels configured to receive a respective one of the plurality of blades through a respective channel opening defined by edges of the outer surface of the body.

13. The apparatus of claim 1, wherein the blade is received, through a channel opening defined by edges of the outer surface of the body, into a channel defined within the body and configured to slidingly receive the blade in at least one of: a direction parallel to a polar axis of the body or a direction perpendicular to the polar axis of the body.

14. The apparatus of claim 13, further comprising a plurality of screws, each of the plurality of screws corresponding to a respective one of the plurality of blades, wherein each of the plurality of screws is configured to releasably fix the respective blade in the body with an outermost surface of a head of the screw proximate to the outer surface of the body.

15. The apparatus of claim 1, wherein the body is made of a material promotes sliding over surfaces without marring.

16. The apparatus of claim 1, wherein the at least two releasably coupled housings comprise a first housing and an opposing second housing, the apparatus further comprising:
a joint pin;
a closure pin;
a first plurality of longitudinally spaced apart first hinge knuckles formed at a first side of the first housing and configured to removably receive the closure pin;
a second plurality of longitudinally spaced apart second hinge knuckles formed at a second side of the first housing and configured to fixedly receive the joint pin;
a third plurality of longitudinally spaced apart third hinge knuckles formed at a first side of the second housing, interlaced with the second hinge knuckles and having the joint pin fixedly received in the second hinge knuckles and rotatably received in the third hinge knuckles; and
a fourth plurality of longitudinally spaced apart fourth hinge knuckles formed at a second side of the second housing and configured to interlace with the first hinge knuckles and have the closure pin releasably fixed through the first hinge knuckles and the fourth hinge knuckles.

17. The apparatus of claim 16, wherein the at least two releasably coupled housings are configured as a closed clam-shell structure about the tow cable and having the fourth hinge knuckles interlaced with the first hinge knuckles and having the closure pin releasably fixed through the first hinge knuckles and the fourth hinge knuckles, wherein the at least two releasably coupled housings grip the tow cable without sliding in a direction of a polar axis of the body.

* * * * *